United States Patent [19]
Sakaue et al.

[11] Patent Number: 5,940,377
[45] Date of Patent: Aug. 17, 1999

[54] ASYNCHRONOUS TRANSFER MODE SWITCH INCLUDING CELL COUNTER VERIFICATION CIRCUITRY

[75] Inventors: Kenji Sakaue, Yokohama; Masahiko Motoyama, Kawasaki, both of Japan

[73] Assignee: Kabushiki Kaisha Toshiba, Tokyo, Japan

[21] Appl. No.: 08/773,791

[22] Filed: Dec. 18, 1996

[30] Foreign Application Priority Data

Dec. 21, 1995 [JP] Japan .................................. 7-333443

[51] Int. Cl.⁶ .......................................................... H04J 3/16
[52] U.S. Cl. ........................................... 370/253; 370/413
[58] Field of Search .................................... 370/232–234, 370/253, 395, 412–414, 417, 418, 468, 252, 244

[56] References Cited

U.S. PATENT DOCUMENTS

| | | | |
|---|---|---|---|
| 4,849,968 | 7/1989 | Turner | 370/232 |
| 5,357,510 | 10/1994 | Norizuki et al. | 370/253 |
| 5,367,520 | 11/1994 | Cordell | 370/395 |
| 5,410,540 | 4/1995 | Aiki et al. | 370/390 |
| 5,455,826 | 10/1995 | Ozveren et al. | 370/232 |
| 5,475,679 | 12/1995 | Munter | 370/395 |

FOREIGN PATENT DOCUMENTS

| | | |
|---|---|---|
| 0410139 | 1/1991 | European Pat. Off. . |
| 0681385 | 11/1995 | European Pat. Off. . |

OTHER PUBLICATIONS

Yasuo Unekawa, et al., A 5Gb/s 8×8 ATM Switch Element CMOS LSI Supporting 5 Quality–of–Service Classes with 200MHz LVDS Interfaces, Semiconductor Device Engineering Laboratory.

Takeo Koinuma, et al., "ATM in B–ISDN Communication System and VLSI Realization", 1994, Symposium on VLSI Circuits of Technical Papers.

Primary Examiner—Jason Chan
Assistant Examiner—Jasper Kwoh
Attorney, Agent, or Firm—Loeb & Loeb LLP

[57] ABSTRACT

An ATM switch having multiple input and output ports is provided. The ATM switch receives ATM cells through the input ports and outputs the ATM cells through one of the output ports in accordance with output port information included in the ATM cells. An output buffer is also provided for each of the output ports to store ATM cells to be output through the output port. A cell counter is provided for each of the output buffers to count the number of ATM cells being stored in the output buffer. Additionally, the ATM switch includes counter verification circuitry for determining whether the cell counters are correctly counting the number of ATM cells stored in the output buffers. In one preferred embodiment, the counter verification circuitry includes a global cell counter that counts the total number of ATM cells being stored in all of the output buffers, an accumulator that determines the total number of ATM cells counted by the cell counters, and a comparator for comparing the accumulated count value with the global count value. Thus, the proper operation of the cell counters can be verified. This minimizes the possibility of improper operation due to a malfunction, even when the ATM switch is operated continuously for a long time period.

23 Claims, 12 Drawing Sheets

ASYNCHRONOUS TRANSFER MODE SWITCH INCLUDING CELL COUNTER VERIFICATION CIRCUITRY

FIELD OF THE INVENTION

The present invention relates to an Asynchronous Transfer Mode ("ATM") switch, and more specifically to an ATM switch having circuitry that is used in managing the number of ATM cells stored in output buffers which are provided for the ATM cell's output ports.

BACKGROUND OF THE INVENTION

Asynchronous Transfer Mode ("ATM") switches are used in a switching network to route ATM cells. In particular, an ATM switch receives an ATM cell at one of its input ports and routes the cell to one of its output ports based on routing information contained within the cell. Each ATM cell is a fixed length data packet having a header section and a data section. FIG. 5 shows an example of a conventional ATM switch that includes output buffers for storing ATM cells. Typically, such ATM switches are realized as one or more integrated circuit chips.

The ATM switch of FIG. 5 is an 8×8 switch. That is, the switch includes eight input ports IP#0–IP#7 for inputting ATM cells, and eight output ports OP#0–OP#7 for outputting ATM cells. In this example, each of the input and output ports transfers ATM cells at a rate of 155 Mbps. Additionally, the ATM cells each have a data length of 64 bytes, including a header portion and a data portion. The header portion includes an output port tag to identify the output port to which the ATM cell is to be routed by the switch.

The ATM cells input to one of the input ports IP are first stored in a FIFO (first in, first out buffer) 10–17 that is provided for the input port. Output port tag information included in an ATM cell stored in the FIFO is read out at the beginning of each cell cycle by a header analysis portion 21 of a control portion 20. The header analysis portion 21 controls the switching operation of a cross bar switch (CRBSW) 22 on the basis of the tag information. More specifically, an output buffer 30–37 is provided for each of the output ports OP#0 to OP#7. The ATM cell is transferred from the FIFO to the output buffer 30–37 corresponding to the output port indicated by the cell's tag information. Generally, each output buffer 30–37 can store multiple ATM cells. A cell counter 40–47 is provided for each of the output buffers 30–37 to keep a count of the number of ATM cells stored in the corresponding output buffer. The cell counters 40–47 receive control signals (namely, increment signals INC0–INC7 and decrement signals DEC0–DEC7) from the control portion 20 that are used by the cell counters to carry out the counting operation.

In the ATM switch of FIG. 5, an output buffer may become filled so that further ATM cells destined for the corresponding output port must be abandoned. For example, consider the case where each of the output buffers 30–37 can store up to six ATM cells. If eight ATM cells are input into the input ports IP in one cell cycle and all eight ATM cells are destined for the same output port OP, then the capacity of the selected output port OP is exceeded. Therefore, there is an overflow and ATM cells must be abandoned. An abandoned cell counter 23 receives a control signal INCD from the control portion 20 in order to count the number of ATM cells (DCCQ, discard cell counter output) that are abandoned by the ATM switch.

ATM switches used in public networks and the like operate continuously for a long period of time (for example, several tens of years). However, the conventional ATM switch does not verify that its cell counters are operating properly. This presents a problem because once a cell counter begins malfunctioning, the number of ATM cells stored in the corresponding output buffer does not match the number reported by the cell counter. If the ATM switch continues to be operated under such conditions, it may malfunction or perform the switching operation poorly. Thus, a conventional ATM switch cannot provide the degree of reliability required for commercial applications.

Additionally, a host processor (not shown) supervises the operation of the ATM switch. The host processor monitors information received from the ATM switch, such as the number of ATM cells stored in each output buffer and the number of cells that have been abandoned. Using this information, the host processor can insure the best flow of ATM cells through a switching system having many ATM switches. However, once one of the cell counters in the conventional ATM switch begins to malfunction, the host processor receives an inaccurate cell count so the flow control performed by the host processor is disturbed. Accordingly, the performance of the entire switching system is reduced.

SUMMARY OF THE INVENTION

In view of these problems, it is an object of the present invention to remove the above-mentioned drawbacks and to provide an ATM switch that includes circuitry for verifying that its cell counters are operating properly. As a result, the ATM switch of the present invention minimizes the possibility of improper operation due to a malfunction, even when it is operated continuously for a long time period. Thus, the ATM switch of the present invention has a high degree of reliability.

According to a first embodiment of the present invention, an ATM switch is provided that includes input ports for receiving ATM cells, output ports for outputting the ATM cells, and output buffers each provided for one of the output ports to store ATM cells to be output through the output port. Additionally, a cell counter is provided for each of the output buffers to count the number of ATM cells being stored in the output buffer. The ATM switch of the first embodiment also includes counter verification circuitry for determining whether the cell counters are correctly counting the number of ATM cells being stored in the output buffers. The counter verification circuitry includes a global cell counter that counts the total number of ATM cells being stored in all of the output buffers, an accumulator that determines the total number of ATM cells counted by the cell counters, and a comparator for comparing the accumulated count value with the global count value.

A second embodiment of the present invention provides an ATM switch having input ports for receiving ATM cells, output ports for outputting the ATM cells, and output buffers each provided for one of the output ports to store ATM cells to be output through the output port. Additionally, the ATM switch has a cell counter for each of the output buffers to count the number of ATM cells being stored in the output buffer, and a global cell counter that counts the total number of ATM cells being stored in all of the output buffers. A register is used to store the count values output by the cell counters and the global count value output by the global cell counter when a verification request is received. A host processor reads the contents of the register, accumulates the total number of ATM cells counted by the cell counters, and compares the total number counted with the global count value to determine if a malfunction has occurred.

According to a third embodiment of the present invention, an ATM switch is provided that includes a cell counters for counting the number of ATM cells being stored in each output buffer, and counter verification circuitry for determining whether the cell counters are correctly counting the number of ATM cells being stored in the output buffers. Additionally, the ATM switch of the third embodiment includes circuitry for indicating a present time during the operation of the ATM switch. When a verification request is received, a register is used to store the present time, the count values output by the cell counters, and the global count value. A host processor can then read the contents of the register, accumulate the total number of ATM cells counted by the cell counters, and compare the total number counted with the global count value to determine if a malfunction has occurred.

A fourth embodiment of the present invention provides an ATM switch having input ports for receiving ATM cells and output ports for outputting the ATM cells. A common buffer receives and stores ATM cells from the input ports, and the ATM cells stored in the common buffer are transferred to the appropriate output ports. Additionally, the ATM switch has a cell counter for each of the output ports to count the number of ATM cells currently stored in the common buffer that are destined for the corresponding output port, and a global cell counter that counts the total number of ATM cells being stored in the common buffer. A register is used to store the count values output by the cell counters and the global count value output by the global cell counter when a verification request is received. A host processor reads the contents of the register, accumulates the total number of ATM cells counted by the cell counters, and compares the total number counted with the global count value to determine if a malfunction has occurred.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the scope of the present invention.

DETAILED DESCRIPTION OF PREFERRED EMBODIMENTS

Preferred embodiments of the present invention will be described in detail hereinbelow with reference to the attached drawings.

Figure 1:
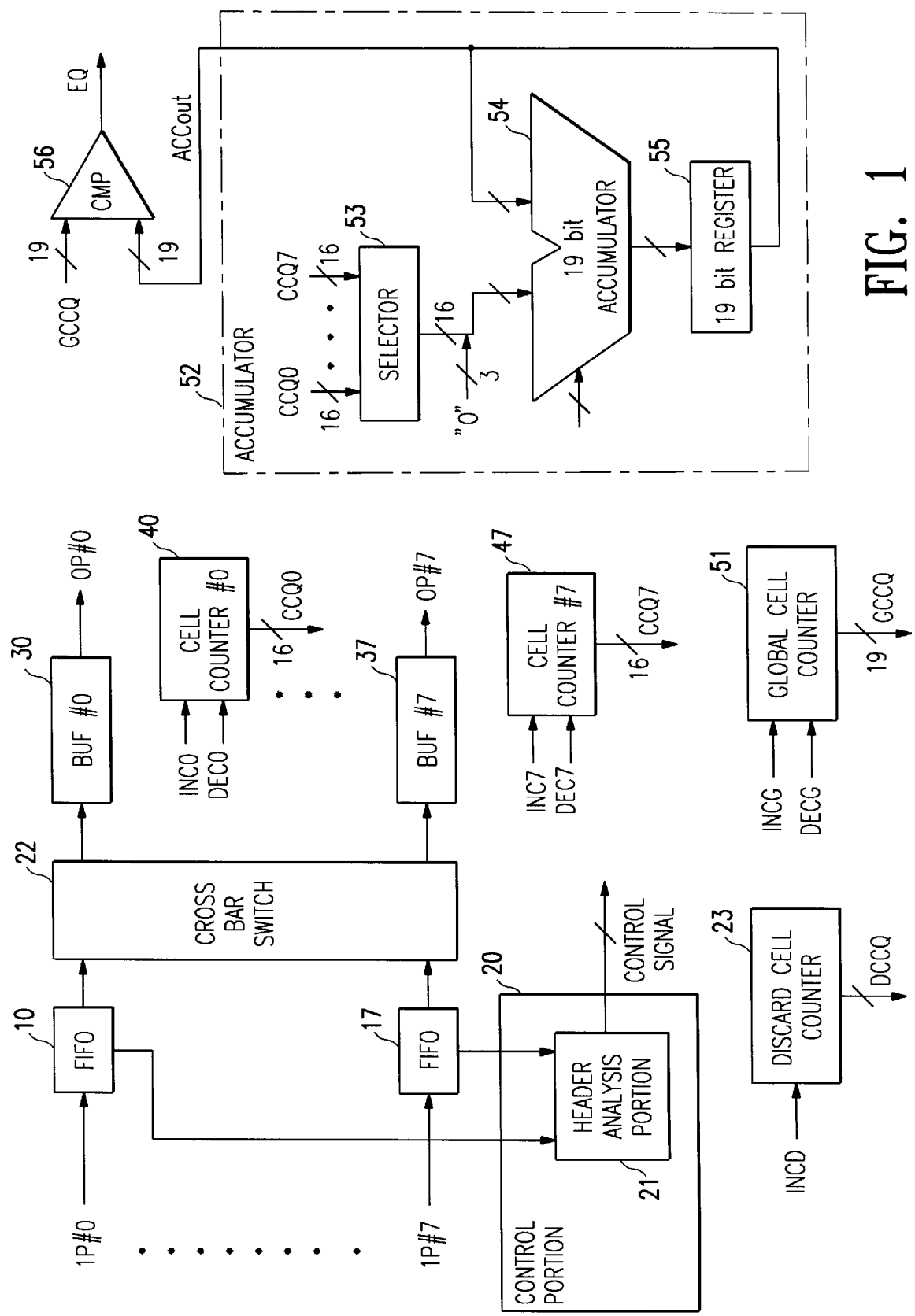
FIG. 1 is a block diagram showing a first embodiment of an ATM switch according to the present invention.

FIG. 1 is a block diagram of an ATM switch according to a first embodiment of the present invention. The ATM switch illustratively includes eight input ports IP#0–IP#7 for inputting ATM cells, and eight output ports OP#0–OP#7 for outputting ATM cells. An output buffer 30–37, which can store multiple ATM cells, is provided for each of the output ports OP#0 to OP#7. The ATM cells input to one of the input ports IP are first stored in a FIFO (first in, first out buffer) 10–17 that is provided for the input port. Output port tag information included in an ATM cell stored in the FIFO is read out at the beginning of each cell cycle by a header analysis portion 21 of a control portion 20. The header analysis portion 21 controls the switching operation of a cross bar switch (CRBSW) 22 on the basis of the tag information. More specifically, each ATM cell is transferred from the FIFO to the output buffer 30–37 that corresponds to the output port indicated by the cell's tag information. A cell counter 40–47 is provided for each of the output buffers 30–37 to keep a count of the number of ATM cells stored in the corresponding output buffer. The cell counters 40–47 use control signals (i.e., increment signals INC0–INC7 and decrement signals DEC0–DEC7) from the control portion 20 to carry out the counting operation. An abandoned cell counter 23 uses a control signal INCD from the control portion 20 to count the number of ATM cells (DCCQ, discard cell counter output) that are abandoned by the ATM switch.

Additionally, the ATM of the first embodiment includes a global cell counter 51, an accumulator 52, and a comparator 56. The global cell counter 51 counts the total number of ATM cells that are stored in all of the output buffers 30–37. The global cell counter 51 receives control signals (i.e., increment signal INCG and decrement signal DECG) from control portion 20, and outputs a global count signal GCCQ. The accumulator 52 includes a selector 53, an accumulator 54, and a register 55. The selector 53 receives cell count signals CCQ0 to CCQ7 from the cell counters 40–47, and successively switches the signals to output each of them in succession to the accumulator 54. In one preferred embodiment, the cell storing capacity of each of the output buffers 30–37 is 64 Kb, each of the cell counters 40–47 is a 16-bit binary counter, and the global cell counter 51 is a 19-bit binary counter (to prevent overflow).

During operation, the accumulator 54 receives cell count signals of 16 bits along with "0" data of 3 bits, and successively adds these signals to obtain an addition result signal of 19 bits. The addition result is stored in the accumulator's register 55, and is output to the comparator 56 as an accumulator count signal ACCout. The comparator 56 receives and compares the count signal ACCout output from the accumulator 52 with the global count signal GCCQ output from the global cell counter 51. If the two count signals are not equal, the comparator 56 outputs a malfunction detection signal EQ to the host processor (not shown).

Accordingly, the first embodiment of the present invention provides an ATM switch that detects a malfunction in any of the cell counters during the operation of the ATM switch. If a malfunction is detected, the host processor can discontinue the operation of the ATM switch to prevent the malfunction from having a negative impact on the performance of the entire switching system. Further, if the ATM switch is a part of a double redundant switching system, only the use of the malfunctioning ATM switch need be discontinued; the other ATM switch can continue its normal operations. Thus, even when the ATM switch of the first embodiment of the present invention is operated for a long time period, proper operation of the ATM switch can be verified. This provides a high degree of reliability.

A second embodiment of the present invention will now be described with reference to FIG. 2. In the first embodiment, the cell counter verifying operation explained above is carried out within the non-operative period of the cell counters (i.e., between the time all of the cell count operations have been completed in one cell cycle and the beginning of the counting operation for the following cell cycle). Thus, to verify proper operation of the cell counters 40–47, the accumulator successively adds the cell count signals CCQ0–CCQ7 from all of the cell counters and the comparator performs its comparison during the non-operative period. Additionally, in the first embodiment, an accumulator and a comparator are added to the circuitry of the ATM switch. Thus, the scale of the additional hardware for verifying the operation of the cell counters is relatively large. In the second embodiment, the host processor that controls the ATM switch is used to verify the operation of the cell counters, so the scale of added hardware can be reduced.

Figure 2:
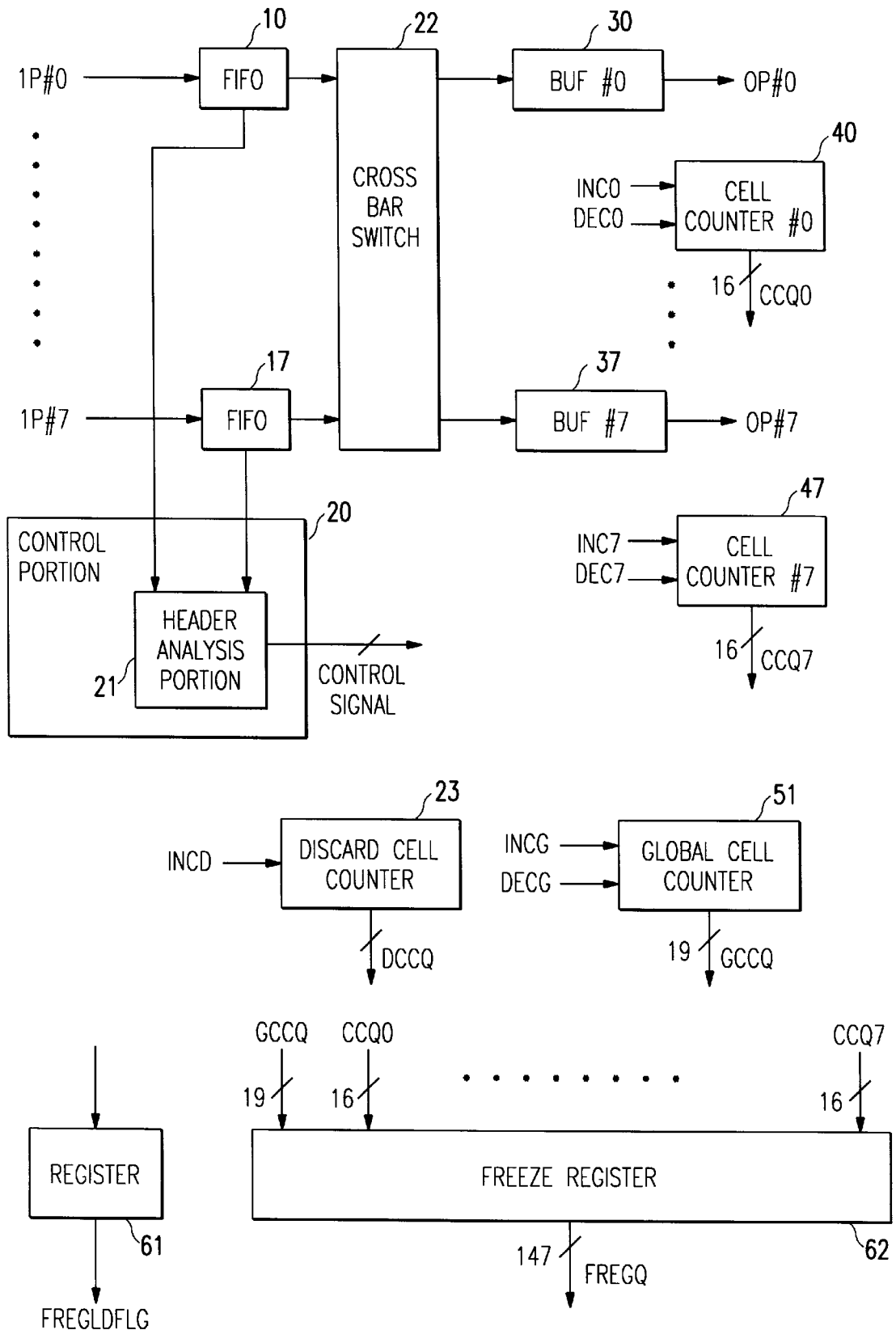
FIG. 2 is a block diagram showing a second embodiment of an ATM switch according to the present invention.

FIG. 2 shows an ATM switch according to the second embodiment of the present invention. In this embodiment, a flag register 62 and a load completion flag register 61 are used instead of the accumulator and comparator. The other circuit elements that form the ATM switch of the second embodiment are identical to those explained above for the first embodiment, so a description thereof is omitted.

During operation, the host processor periodically sends a counter verification request to the ATM switch. The control portion 20 of the ATM switch checks for such a request every cell cycle. When the counter verification request is sent from the host processor, the 16-bit cell count signals CCQ0 to CCQ7 from the cell counters 40–47 and a 19-bit global count signal GCCQ from the global counter 51 are input to and stored in the flag register 62. This operation is performed during the non-operative period of the cell counters, as described above. When all of the count signals have been stored in the flag register 62, the load completion flag register 61 receives a load completion signal from the control portion 20, and outputs the load completion signal FREGLDFLG to the host processor. The host processor uses the load completion signal to set an interrupt for processing the information in the flag register.

Next, the host processor reads the cell count signals CCQ0 to CCQ7 and the global count signal GCCQ that are stored in the flag register 62. The host processor adds the values of all the cell count signals, and compares the result with the value of the global count signal. If these two values are equal, the cell counters are judged to be operating properly so the operation of the ATM switch is continued. Conversely, if the comparison finds that the two values are not equal, the host processor concludes that at least one of the cell counters has malfunctioned so the operation of the ATM switch is discontinued. Here again, if the ATM switch is a part of a double redundant switching system, only the use of the malfunctioning ATM switch need be discontinued; the other ATM switch can continue its normal operations.

If the flag register were not provided, the host processor would have to compare the total value of all of the cell counters and value of the global counter within a single non-operative period of the counters. More specifically, within a single non-operative period of the counters, the host processor would be required to read all the cell count signals CCQ0 to CCQ7, read out the global count signal GCCQ, and determine the total value of all the cell count signals for comparison with the value of the global count signal. Therefore, if the host processor operates at a slower speed than the ATM switch, the cell counter verification operation cannot be realized. This problem becomes more relevant as the ATM switch increases in scale. An increase in scale leads to an increase in the number of ports. This, in turn, causes an increase in the number of cell counters and thus, an increase in the number of cell count signals that must be read by the host processor. Furthermore, when the transfer rate of the ATM switch is increased (for example, from 155 Mbps to 622 Mbps), the non-operative period of the counters is decreased so the verification operation becomes more difficult.

However, in the second embodiment of the present invention, the count values are read and stored in the flag register 62 until the host processor issues another counter verification request. Thus, the host processor can carry out the counter verification operation without being constrained by the number of counters or the length of the non-operative period of the counters. Accordingly, in the second embodiment, the host processor is able to verify operation of the cell counters even if the host processor operates at a slower speed than the ATM switch or if the number of ports included in the ATM switch is high. Additionally, as compared with the first embodiment, the second embodiment of the present invention has a lower manufacturing cost because it requires less added circuitry for the counter verification operation.

A third embodiment of the present invention will now be described with reference to FIG. 3. In this embodiment, the ATM switch includes a present time counter 63 that generates a present time signal PTCQ. The present time signal has a bit width that is sufficient for indicating the time of operation of the ATM switch. Typically, the bit width of the present time signal PTCQ is less than or equal to the bit width of the count signal CCQ from a cell counter. Further, the initial value of the present time counter 63 is set when the ATM switch begins operation. Through the provision of the present time counter, present time information (i.e., the present time signal PTCQ) can be stored in the flag register 62 for the host processor along with the count information. The other circuit elements that form the ATM switch of the third embodiment are identical to those explained above for the second embodiment, so a description thereof is omitted.

During operation, the host processor sends a counter verification request to the ATM switch. When the counter verification request is sent from the host processor, the control portion 20 causes the present time signal PTCQ (output from the present time counter 63) to be input to and stored in the flag register 62, along with the cell count signals CCQ0 to CCQ7 and the global count signal GCCQ. When the present time signal and all of the count signals have been stored in the flag register, the load completion flag register 61 receives a load completion signal, and outputs the load completion signal FREGLDFLG to the host processor. The load completion signal can be used by the host processor to set an interrupt.

Next, the host processor compares the total value of the cell count signals with the value of the global count signal in the same manner as in the second embodiment. Additionally, in the third embodiment, the host processor can use the present time information from the flag register 62 to identify the "time" (i.e., the cell cycle) in which the count information was stored in the flag register 62. Therefore, when a malfunction in the cell counters of the ATM switch is detected, the host processor can identify the time frame within which the malfunction occurred. As a result, the third embodiment of the present invention allows the host processor to control the ATM switch with a higher accuracy.

A fourth embodiment of the present invention will now be described with reference to FIG. 4. In this embodiment, the individual output buffers 30–37 are replaced by a common output buffer 72 that is connected between a multiplexer 74 and demultiplexer 76. The common output buffer includes a "logic queue buffer" for each of the output ports OP#0 to OP#7. The other circuit elements that form the ATM switch of the fourth embodiment are identical to those explained above for the third embodiment, so a description thereof is omitted.

In the first through third embodiments, each output buffer was dedicated to a specific output port and had a fixed cell capacity. However, in the fourth embodiment, the cell capacity of each "logic queue buffer" can be altered during operation. In other words, the number of ATM cells allotted to each of the output ports can be changed (e.g., based on the incoming cells). Thus, with the same total output buffer cell capacity, the common buffer of the fourth embodiment can more efficiently use the provided buffer memory space so that the number of abandoned ATM cells can be lessened. On the other hand, the control circuitry is more complex in the fourth embodiment because the single common buffer memory space contains the multiple logic queue buffers.

During operation, the ATM cells input to one of the input ports IP are first stored in a FIFO 10–17 for the input port. Output port tag information included in an ATM cell stored in the FIFO is read out at the beginning of each cell cycle by a header analysis portion 21 of a control portion 20. The ATM cell is transferred through the multiplexer 74 to the appropriate "logic queue buffer" of the common buffer 72 on the basis of the tag information. The ATM cells stored in a logic queue buffer are read out by the control portion 20 and are transferred through the demultiplexer 76 to the output port corresponding to the logic queue buffer.

A cell counter 40–47 is provided to keep a count of the number of ATM cells stored in each of the logic queue buffers using control signals from the control portion 20. Additionally, an abandoned cell counter 23 uses a control signal from the control portion 20 to count the number of ATM cells that are abandoned, and a global cell counter 51 counts the total number of ATM cells that are stored in the common buffer 72 using control signals from control portion 20. The count values are read and stored in the flag register 62 when the host processor issues a counter verification request, and the operation of the ATM switch is then verified in the same manner as in the second and third embodiments.

In the above-described embodiments, the abandoned cell count signal DCCQ generated by the abandoned cell counter 23 as a count of the number of abandoned ATM cells is not stored in the flag register 62. However, the abandoned cell count signal DCCQ could be stored in the flag register 62 and read out by the host processor. Additionally, the number of input and output ports, the number of cell counters, and the bit widths of the count signals are merely design choices that could be easily adapted to another situation by one of ordinary skill in the art.

As described above, in the ATM switch of the present invention, circuitry is provided for verifying that the ATM switch's cell counters are operating properly. This minimizes the possibility of improper operation due to a malfunction, even when the ATM switch is operated continuously for a long time period. Thus, the ATM switch of the present invention provides a high degree of reliability.

Figure 3:
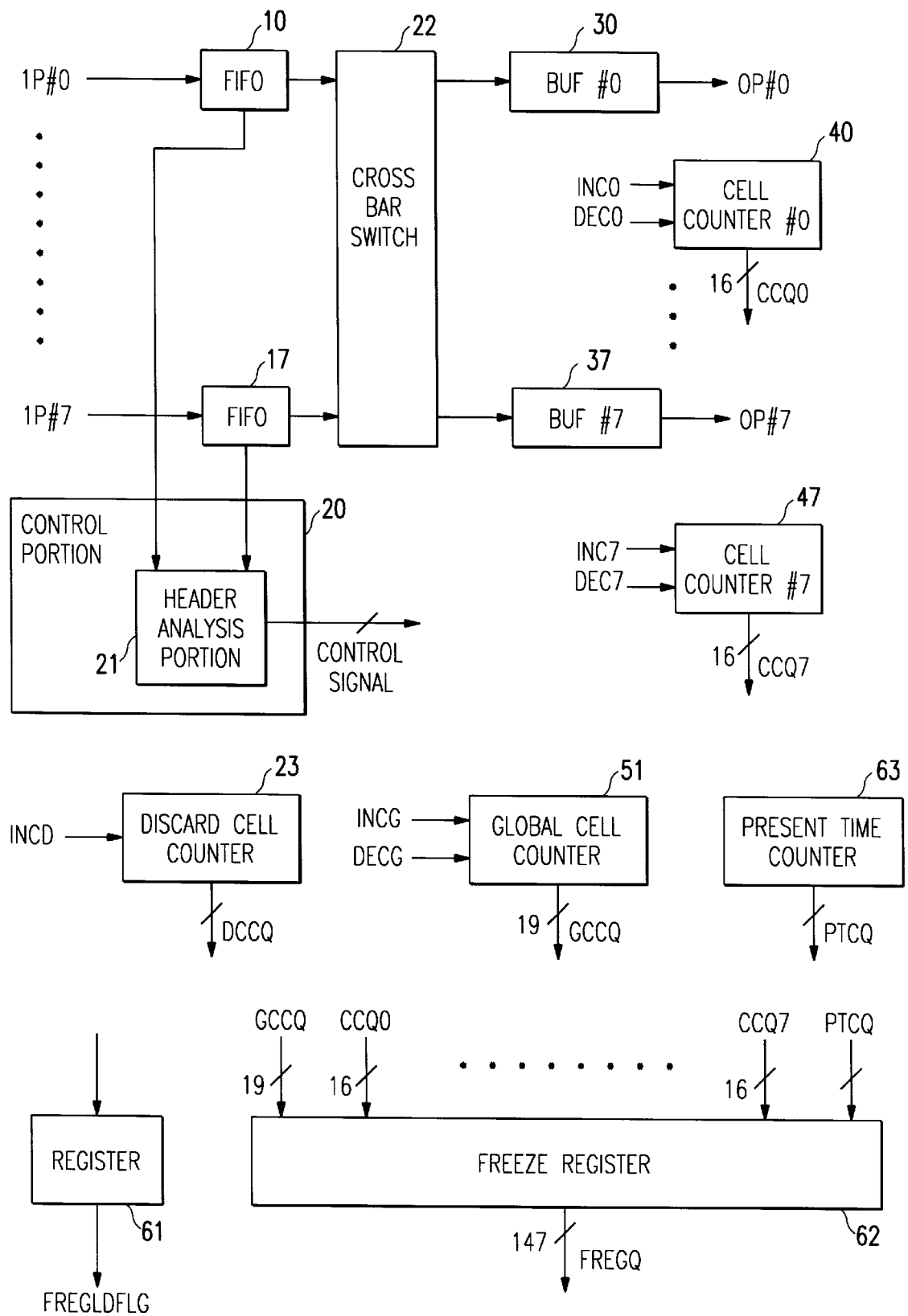
FIG. 3 is a block diagram showing a third embodiment of an ATM switch according to the present invention.
Figure 4:
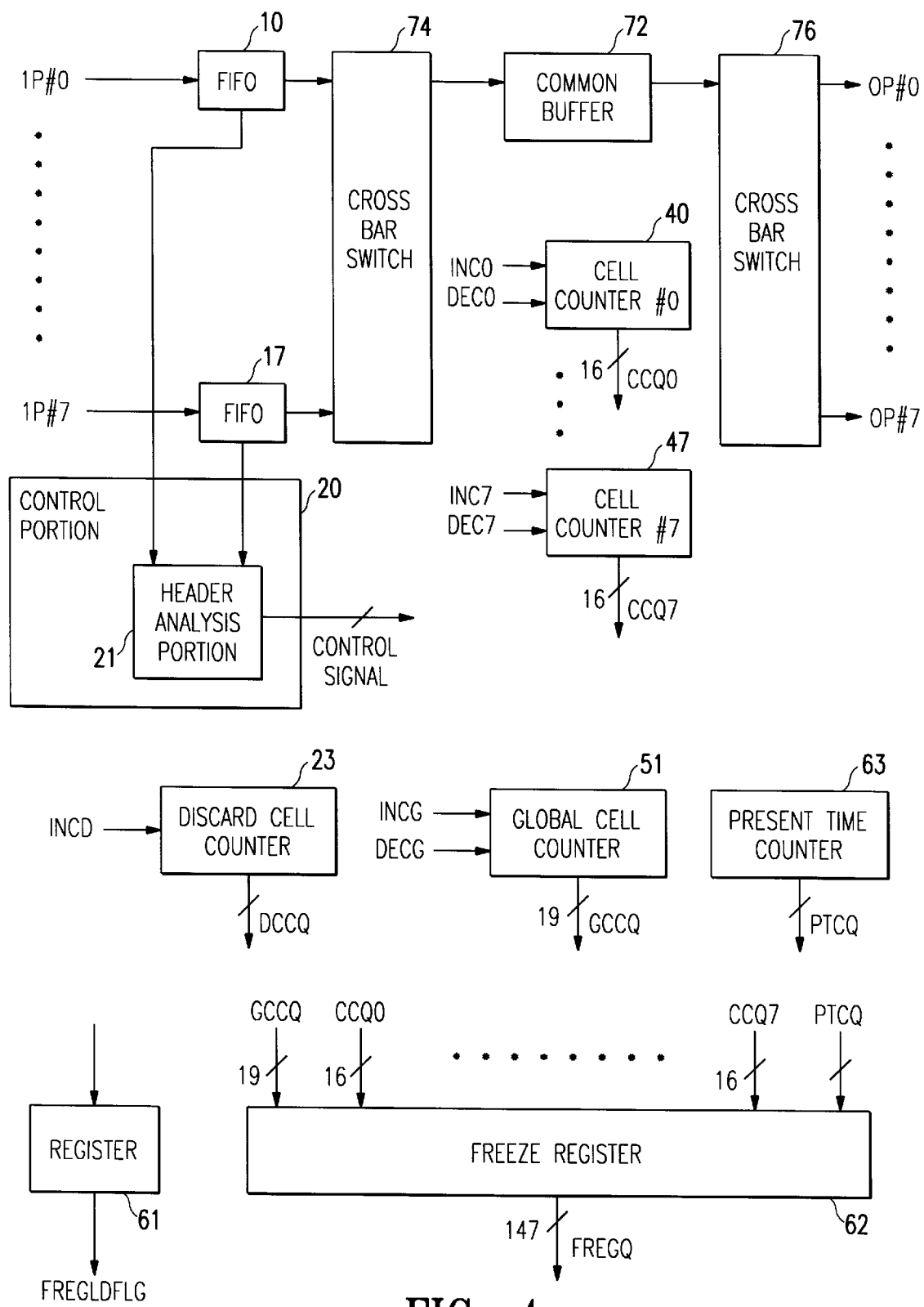
FIG. 4 is a block diagram showing a fourth embodiment of an ATM switch according to the present invention.
Figure 5:
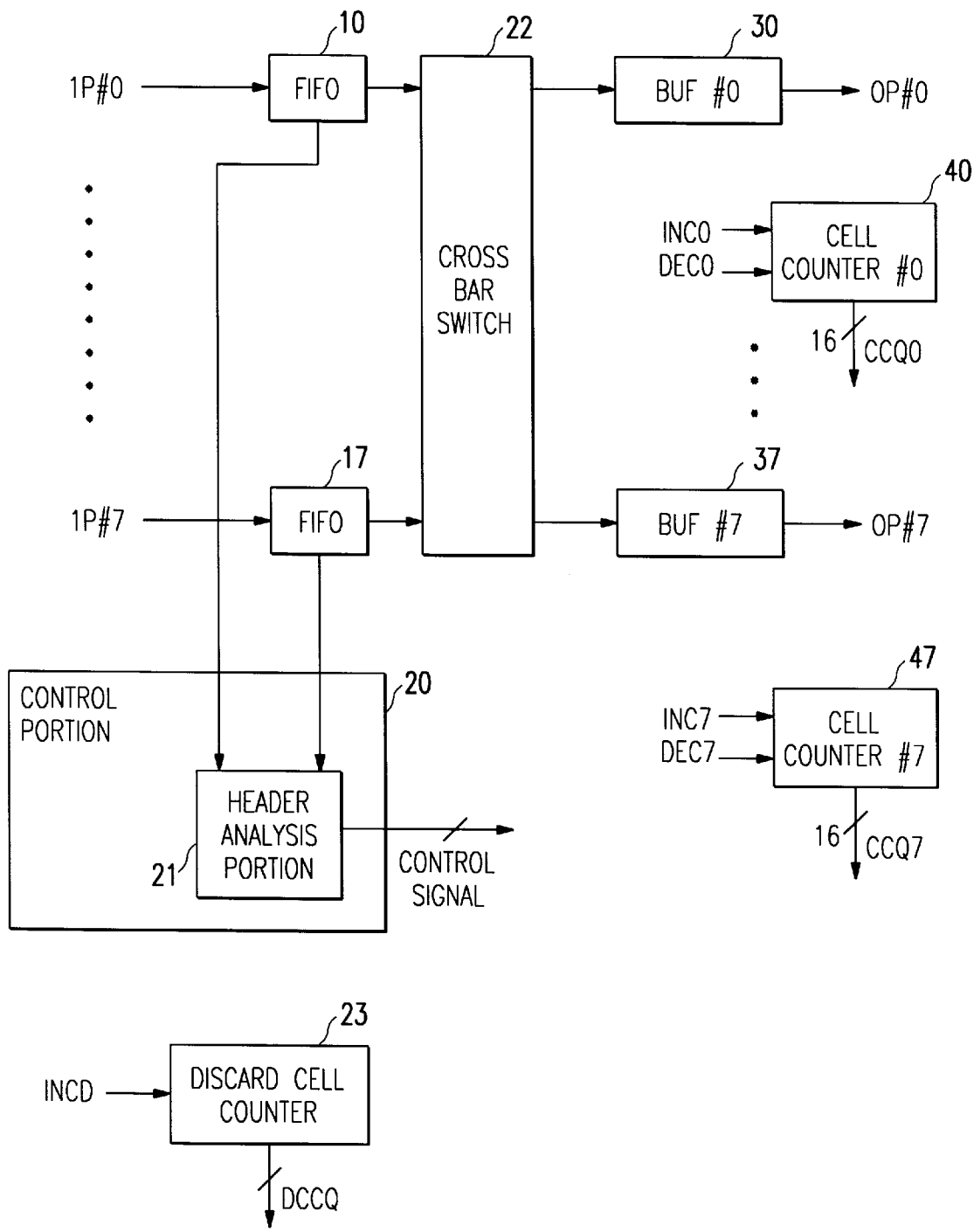
FIG. 5 is a block diagram showing a conventional ATM switch.
Figure 6:
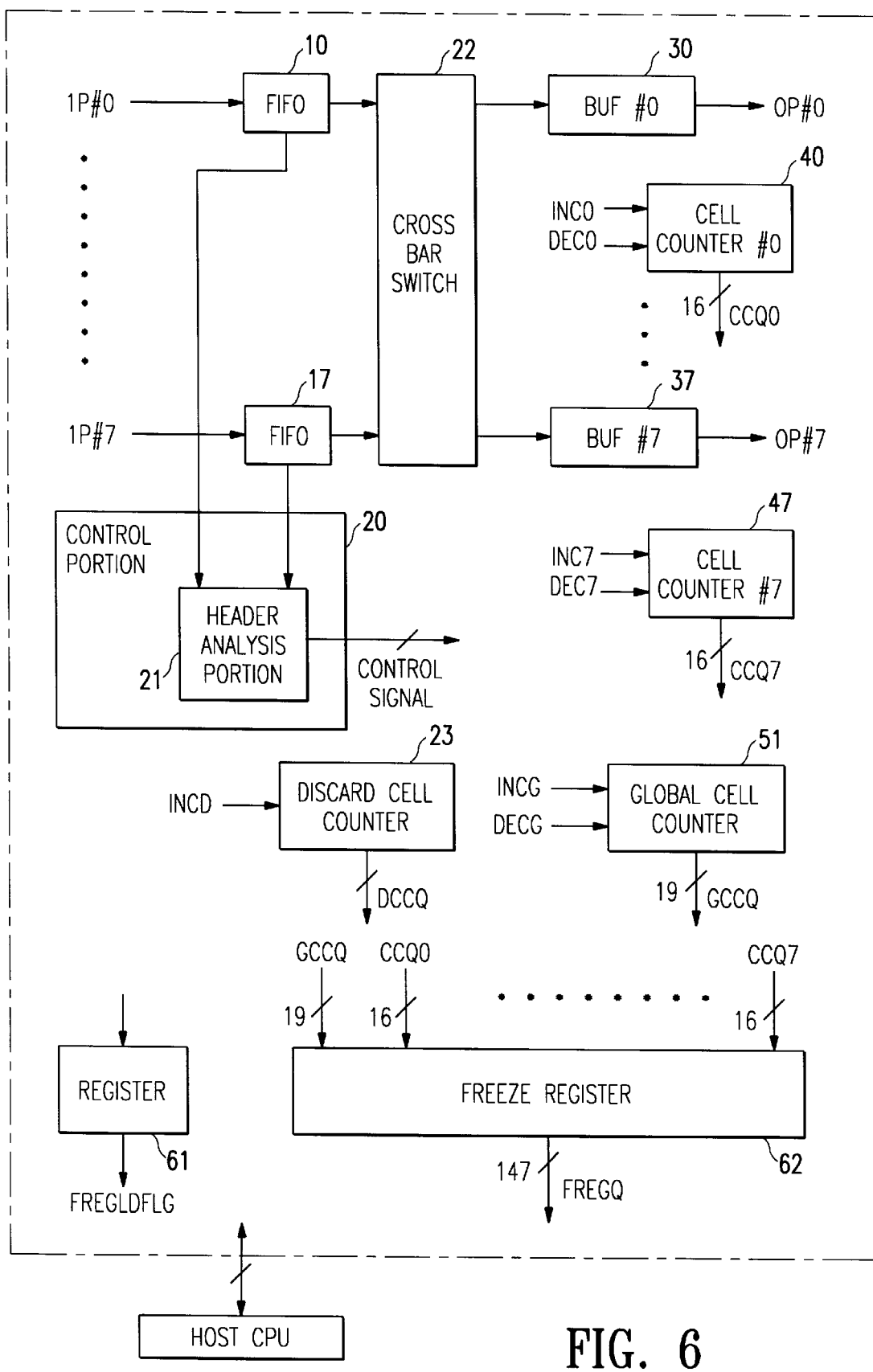
FIGS. 6–8 show the circuits of FIGS. 2–4, respectively, in communication with a host processor.
Figure 7:
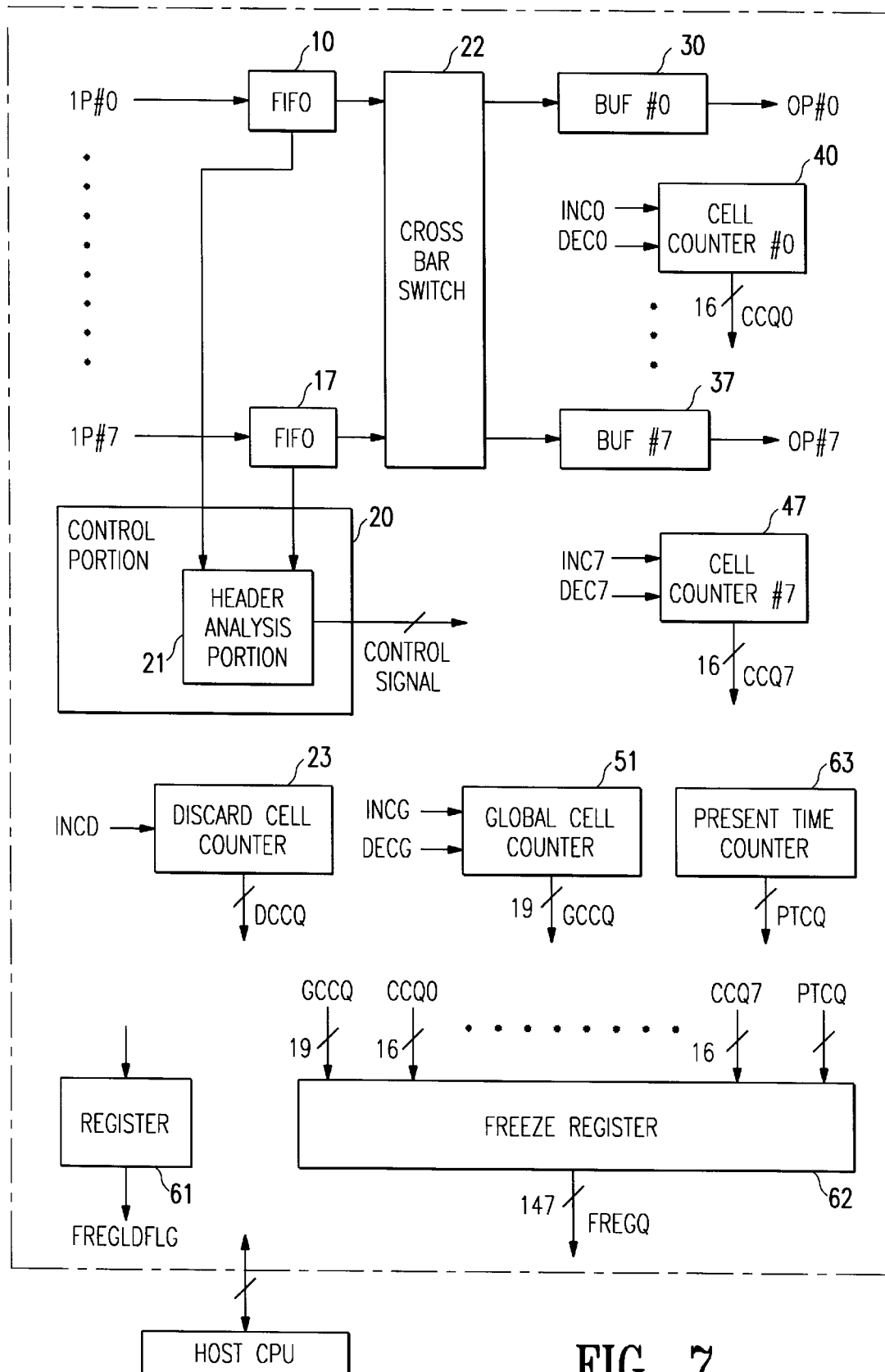
Figure 8:
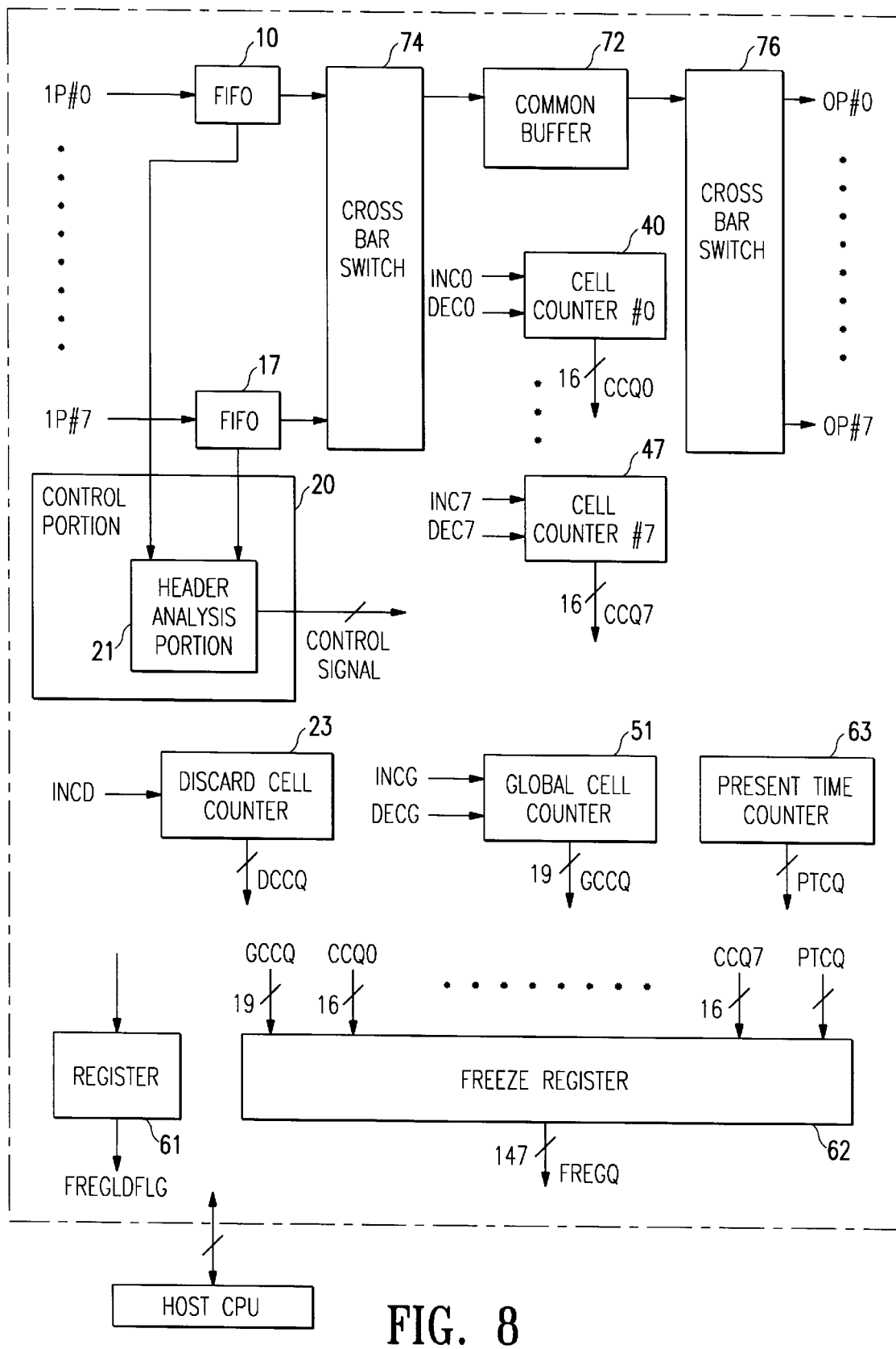

FIGS. 6–8 show the circuits of FIGS. 2–4, respectively, in communication with a host processor.

Figure 9:
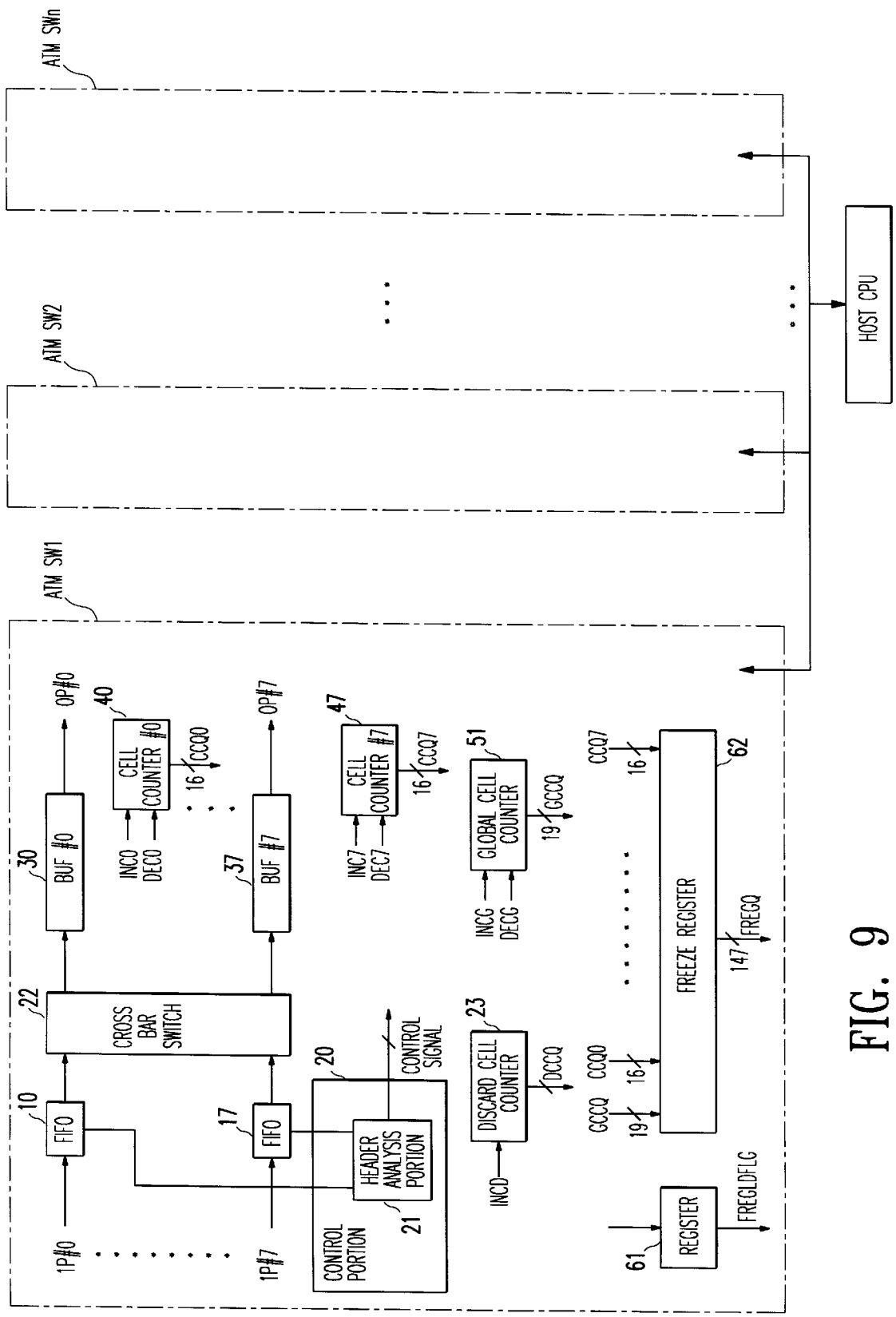
FIGS. 9–11 show the circuits of FIGS. 2–4, respectively, in a multiple switch configuration.
Figure 10:
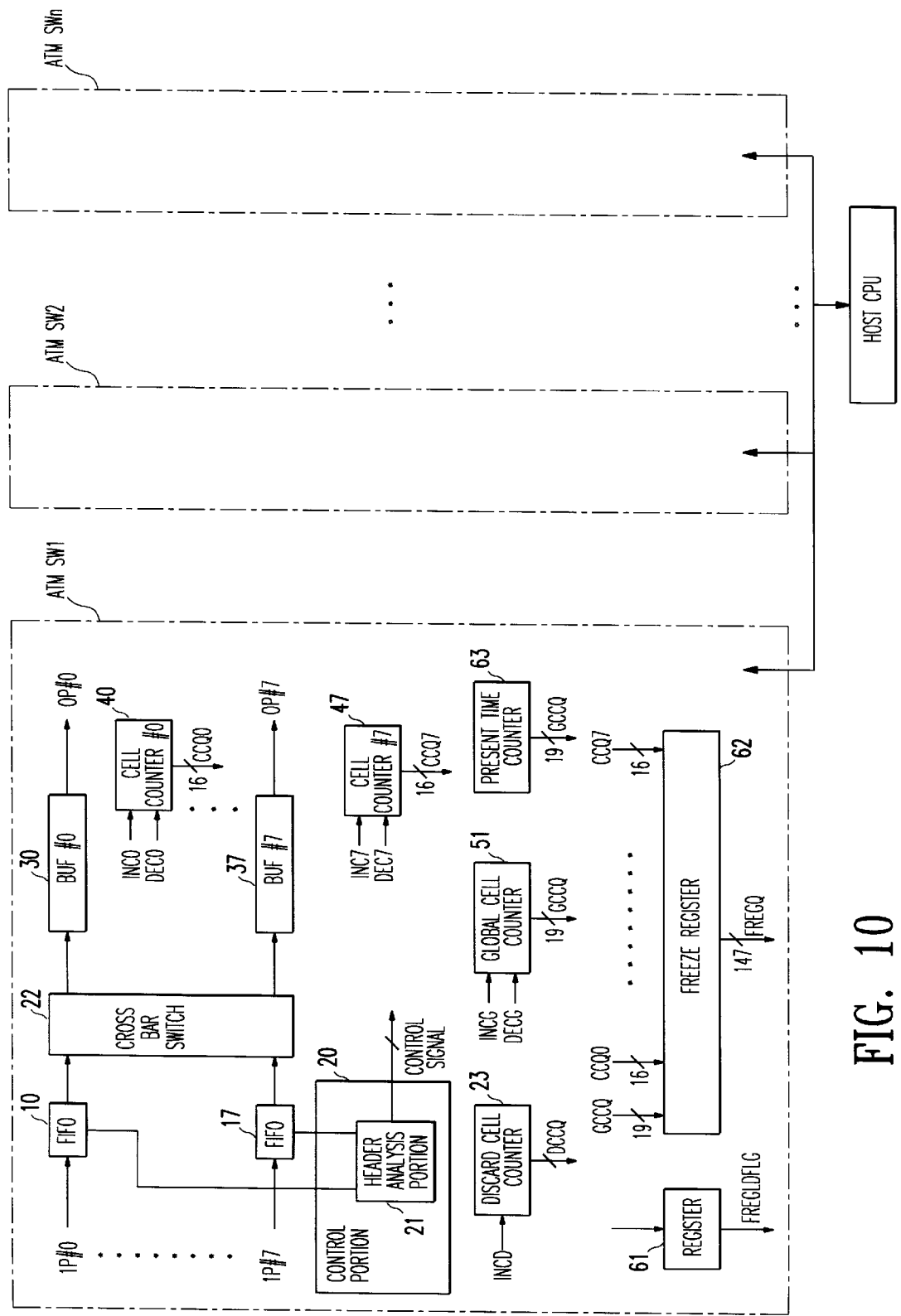
Figure 11:
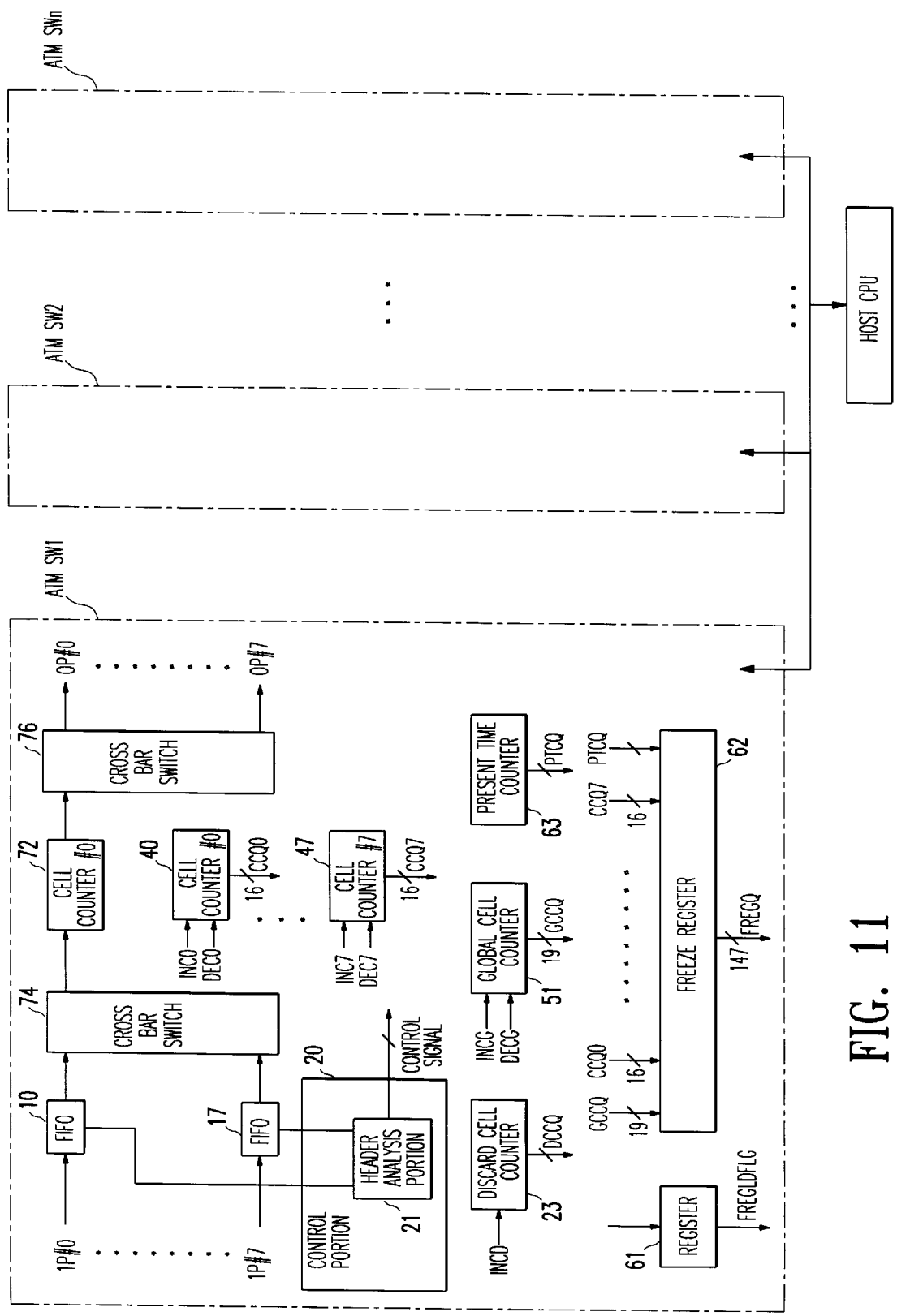

FIGS. 9–11 show the circuits of FIGS. 2–4, respectively, in a multiple switch configuration.

Figure 12:
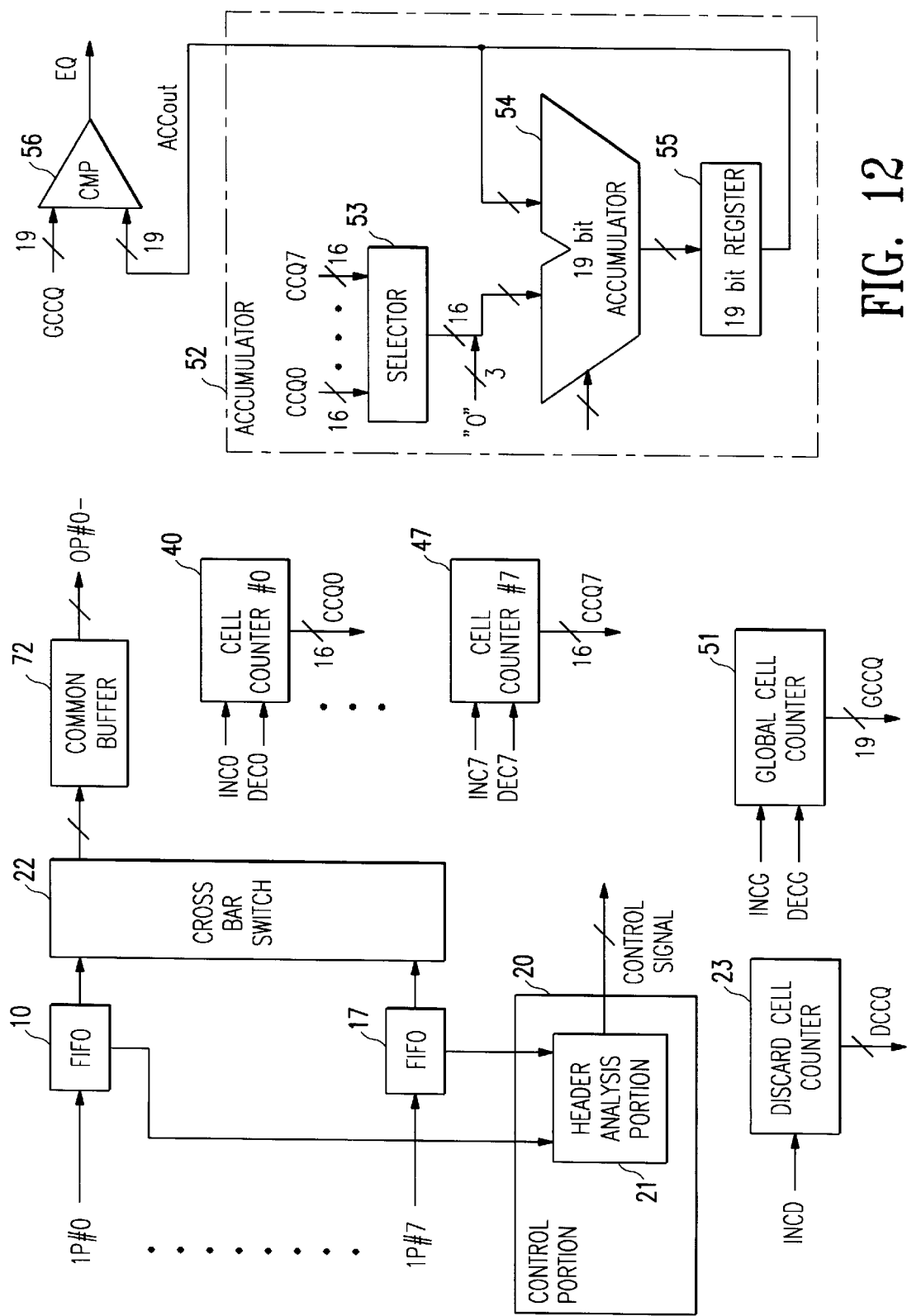
FIG. 12 shows the circuit of FIG. 1 including a common buffer.

FIG. 12 shows the circuit of FIG. 1 in which the buffer 30 of FIG. 1 has been replaced by a common buffer 72.

While there has been illustrated and described what are presently considered to be the preferred embodiments of the present invention, it will be understood by those in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An ATM switch including cell counter verification circuitry having a plurality of input ports and a plurality of output ports, the ATM switch receiving ATM cells through the input ports and outputting each of the ATM cells through one of the output ports in accordance with output port information included in the ATM cell, said ATM switch comprising:

a plurality of output buffers, each of the output buffers being provided for one of the output ports to store ATM cells to be output through the output port;

a plurality of cell counters, each of the cell counters being provided for one of the output buffers to count the number of ATM cells stored in the output buffer, the number of stored ATM cells being output as the cell counter's count value; and a global cell counter for counting the total number of ATM cells stored in the output buffers, the total number of stored ATM cells being output as a global count value;

verification means for totaling the count values output by all of the cell counters to obtain a total count value and comparing the total count value with the global count value;

wherein the verification means outputs a malfunction signal when the total count value and the global count value are not equal.

2. The ATM switch as defined in claim 1, wherein the counter verification means also includes:

an accumulation means for determining the total number of ATM cells counted by the cell counters to obtain an accumulated count value; and a comparison means for comparing the accumulated count value from the accumulation means with the global count value output by the global cell counter, and for outputting a malfunction detection signal when the accumulated count value and the global count value are not equal.

3. The ATM switch as defined in claim 1, wherein the counter verification means also includes:

a selector for receiving the count values output by the cell counters, and for successively outputting each of the count values;

an accumulator for receiving and accumulating the count values output successively from the selector to output an accumulated count value;

a register for storing the accumulated count value output from the accumulator; and a comparator for comparing the accumulated count value stored in the register with the global count value output by the global cell counter, and for outputting a malfunction detection signal when the accumulated count value and the global count value are not equal.

4. The ATM switch as defined in claim 1, wherein the counter verification means also includes a register for receiving and storing the count values output by the cell counters and the global count value output by the global cell counter when a verification request is received.

5. The ATM switch as defined in claim 4, wherein the counter verification means also includes a present time circuit for indicating a present time.

6. The ATM switch as defined in claim 4, wherein a completion signal is generated when the count values output by the cell counters and the global count value output by the global cell counter have been stored in the register.

7. An ATM switch comprising:

a plurality of input ports for receiving ATM cells;

a plurality of output ports for outputting ATM cells;

a crossbar switch receiving ATM cells from the input ports and selectively connecting each received ATM cell to one of the output ports in accordance with output port information contained within the ATM cell;

a plurality of output buffers, each of the output buffers being provided for one of the output ports to received and stored ATM cells from the crossbar switch that are to be output from the output port;

a plurality of cell counters, each of the cell counters being provided for one of the output buffers to count the number of ATM cells currently stored in the output buffer, the number of stored ATM cells being output as the cell counter's count value; and a global cell counter for counting the total number of ATM cells currently stored in all of the output buffers, the total number of stored ATM cells being output as a global count value;

a plurality of storing means, each of the storing means being provided for one of the input ports to store ATM cells received by the input port, the storing means selectively outputting the stored ATM cells to the crossbar switch;

an analyzing circuit for analyzing the output port information contained in each of the ATM cells stored in the storing means; and verification means for totaling the count values output by all of the cell counters to obtain a total count value, and for comparing the total count value with the global count value;

wherein the verification means outputs a malfunction signal when the total count value and the global count value are not equal.

8. The ATM switch as defined in claim 7, wherein the verification means includes:

a selector for receiving the count values output by all of the cell counters, and for successively outputting each of the received count values;

an arithmetic circuit for totaling the count values output successively from the selector to output the total count value;

a register for storing the total count value output from the accumulator; and a comparator for comparing the accumulated count value stored in the register with the global count value output by the global cell counter.

9. The ATM switch as defined in claim 7, further comprising a register for storing the global count value output by the global cell counter and the count values output by all of the cell counters when a verification request is received.

10. The ATM switch as defined in claim 9, further comprising a present time counter for indicating a present time.

11. The ATM switch as defined in claim 9, wherein a completion signal is generated when the global count value output by the global cell counter and the count values output by all of the cell counters have been stored in the register.

12. The ATM switch as defined in claim 9, wherein a host processor reads the contents of the register, accumulates the total number of ATM cells counted by the cell counters, and compares the total number counted with the global count value, the host processor determining that a malfunction has occurred when the total number counted and the global count value are not equal.

13. The ATM switch comprising:

a plurality of input ports for receiving ATM cells;

a plurality of output ports for outputting ATM cells;

a crossbar switch receiving ATM cells from the input ports and selectively connecting each received ATM cell to one of the output ports in accordance with output port information contained within the ATM cell;

a plurality of output buffers, each of the output buffers being provided for one of the output ports to received and stored ATM cells from the crossbar switch that are to be output from the output port;

a plurality of cell counters, each of the cell counters being provided for one of the output buffers to count the number of ATM cells currently stored in the output buffer, the number of stored ATM cells being output as the cell counter's count value; and a global cell counter for counting the total number of ATM cells currently stored in all of the output buffers, the total number of stored ATM cells being output as a global count value, a plurality of storing means, each of the storing means being provided for one of the input ports to store ATM cells received by the input port, the storing means selectively outputting the stored ATM cells to the crossbar switch;

an analyzing circuit for analyzing the output port information contained in each of the ATM cells stored in the storing means; and a host processor that accumulates the total number of ATM cells counted by the cell counters and compares the total number counted with the global count value, the host processor determining that a malfunction has occurred if the total number counted and the global count value are not equal.

14. The ATM switch as defined in claim 13, further comprising a present time counter for indicating a present time, wherein the host processor determines that a malfunction has occurred at the present time indicated by the present time counter when a verification request is received if the total number counted and the global count value are not equal.

15. An ATM switching system for processing ATM cells, said ATM switching system comprising:

a host processor; and a plurality of ATM switches that are controlled by the host processor, wherein each of the ATM switches has a plurality of input ports for receiving ATM cells, and a plurality of output ports for outputting ATM cells, and further includes:

switching means for receiving ATM cells from the input ports and selectively routing the received ATM cells to the output ports in accordance with output port information contained within the ATM cells;

a plurality of output buffers, each of the output buffers being provided for one of the output ports to store ATM cells that are to be output from the output port;

a plurality of cell counters, each of the cell counters being provided for one of the output buffers to count the number of ATM cells being stored in the output buffer, the number of stored ATM cells being output as the cell counter's count value;

a global cell counter for counting the total number of ATM cells being stored in all of the output buffers, the total number of stored ATM cells being output as a global count value;

a register for storing the global count value and the count values output by all of the cell counters when a verification request is generated by the host processor, a plurality of storing means each of the storing means being provided for one of the input ports to store ATM cells received by the input port; and an analyzing circuit for analyzing the output port information contained in each of the ATM cells stored in the storing means, wherein for at least one of the ATM switches, the host processor reads the contents of the ATM switch's register, calculates the total number of ATM cells counted by the cell counters of the ATM switch using the cell counter count values read from the register, and compares the total number counted with the global count value output by the ATM switch's global cell counter, a malfunction of the ATM switch being detected if the total number counted and the global count value are not equal.

16. The ATM switching system as defined in claim 15, wherein each of the ATM switches also includes a present time counter for indicating a present time during the operation of the ATM switch.

17. The ATM switching system as defined in claim 16, wherein, in each of the ATM switches, the register also stores the present time indicated by the present time counter when the verification request is generated, and for at least one of the ATM switches, the host processor reads the contents of the ATM switch's register, calculates the total number of ATM cells counted by the ATM switch's cell counters using the count values read from the register, and compares the total number counted with the global count value output by the ATM switch's global cell counter, the host processor determining that the ATM switch has malfunctioned at the present time stored in the register if the total number counted and the global count value are not equal.

18. An ATM switch comprising:

a plurality of input ports for receiving ATM cells' a plurality of output ports for outputting ATM cells;

a common buffer for receiving and storing ATM cells from the input ports, the ATM cells stored in the common buffer being transferred to the appropriate output ports;

a plurality of cell counters, each of the cell counters being provided for one of the output ports to count the number of ATM cells currently stored in the common buffer that are destined for the corresponding output port, the number of stored ATM cells being output as the cell counter's count value;

a global cell counter for counting the total number of ATM cells currently stored in the common buffer, the total number of stored ATM cells being output as a global count value;

a plurality of storing means, each of the storing means being provided for one of the input ports to store ATM cells received by the input port, the storing means selectively outputting the stored ATM cells to the common buffer;

an analyzing circuit for analyzing the output port information contained in each of the ATM cells stored in the storing means;

a verification circuit for totaling the count values output by all of the cell counters to obtain a total count value, and for comparing the total count value with the global count value, wherein the verification means outputs a malfunction signal when the total count value and the global count value are not equal.

19. The ATM switch as defined in claim 18, wherein the verification circuit includes:

a selector for receiving the count values output by all of the cell counters, and for successively outputting each of the received count values;

an arithmetic circuit for totaling the count values output successively from the selector to output the total count value;

a register for storing the total count value output from the accumulator; and a comparator for comparing the accumulated count value stored in the register with the global count value output by the global cell counter.

20. The ATM switch as defined in claim 18, further comprising a register for storing the global count value output by the global cell counter and the count values output by all of the cell counters when a verification request is received.

21. The ATM switch as defined in claim 20, wherein a host processor reads the contents of the register, accumulates the total number of ATM cells counted by the cell counters, and compares the total number counted with the global count value, the host processor determining that a malfunction has occurred when the total number counted and the global count value are not equal.

22. An ATM switch comprising:

a plurality of input ports for receiving ATM cells;

a plurality of output ports for outputting ATM cells;

a common buffer for receiving and storing ATM cells from the input ports, the ATM cells stored in the common buffer being transferred to the appropriate output ports;

a plurality of cell counters, each of the cell counters being provided for one of the output ports to count the number of ATM cells currently stored in the common buffer that are destined for the corresponding output port, the number of stored ATM cells being output as the cell counter's count value;

a global cell counter for counting the total number of ATM cells currently stored in the common buffer, the total number of stored ATM cells being output as a global count value;

a plurality of storing means, each of the storing means being provided for one of the input ports to store ATM cells received by the input port, the storing means selectively outputting the stored ATM cells to the common buffer;

an analyzing circuit for analyzing the output port information contained in each of the ATM cells stored in the storing means;

a host processor that accumulates the total number of ATM cells counted by the cell counters, and compares the total number counted with the global count value, the host processor determining that a malfunction has occurred if the total number counted and the global count value are not equal.

23. The ATM switch as defined in claim 22, further comprising a present time counter for indicating a present time, wherein the host processor determines that a malfunction has occurred at the present time indicated by the present time counter when a verification request is received if the total number counted and the global count value are not equal.

* * * * *